(12) United States Patent
Boyle et al.

(10) Patent No.: US 9,160,899 B1
(45) Date of Patent: Oct. 13, 2015

(54) FEEDBACK AND MANUAL REMOTE CONTROL SYSTEM AND METHOD FOR AUTOMATIC VIDEO RECORDING

(71) Applicant: H4 Engineering, Inc., San Antonio, TX (US)

(72) Inventors: Christopher T. Boyle, San Antonio, TX (US); Scott K. Taylor, San Antonio, TX (US); Alexander G. Sammons, San Antonio, TX (US); John O'Callaghan, San Antonio, TX (US)

(73) Assignee: H4 Engineering, Inc., San Antonio, TX (US)

( * ) Notice: Subject to any disclaimer, the term of this patent is extended or adjusted under 35 U.S.C. 154(b) by 27 days.

(21) Appl. No.: 13/726,451

(22) Filed: Dec. 24, 2012

Related U.S. Application Data (60) Provisional application No. 61/580,080, filed on Dec. 23, 2011, provisional application No. 61/580,084, filed on Dec. 23, 2011, provisional application No. 61/580,093, filed on Dec. 23, 2011, provisional application No. 61/580,101, filed on Dec. 23, 2011, provisional application No. 61/580,112, filed on Dec. 23, 2011, provisional application No. 61/580,115, filed on Dec. 23, 2011, provisional application No. 61/745,346, filed on Dec. 21, 2012.

(51) Int. Cl.
*H04N 5/765* (2006.01)
*H04N 5/222* (2006.01)

(52) U.S. Cl.
CPC .................... *H04N 5/222* (2013.01)

(58) Field of Classification Search
CPC .............................. H04N 5/765; H04N 5/782
USPC .......................................................... 386/234
See application file for complete search history.

(56) References Cited

U.S. PATENT DOCUMENTS

| 4,683,729 A | 8/1987 | Rogers |
| 4,980,871 A | 12/1990 | Sieber et al. |
| 5,073,824 A | 12/1991 | Vertin |
| 5,363,297 A | 11/1994 | Larson et al. |

(Continued)

FOREIGN PATENT DOCUMENTS

| EP | 0660131 A1 | 6/1995 |
| JP | 2005020205 A | 1/2005 |

(Continued)

OTHER PUBLICATIONS

E. Calais, The Global Positioning System, Presentation Slides, available at date of publication unknown, available at URL web.ics.purdue.edu/~ecalais/teaching/geodesy/GPS_observables.pdf.

(Continued)

*Primary Examiner* — Thai Tran
*Assistant Examiner* — Nien-Ru Yang
(74) *Attorney, Agent, or Firm* — Volk & McElroy, LLP; Michael D. Volk, Jr.

(57) ABSTRACT

Feedback devices to keep a person being filmed, photographed, or otherwise recorded automatically by a recording system or automated camera pointing or similar system informed about the recording and manual remote control devices which allow the person being filmed, photographed, or otherwise recorded to take control of the recording camera or automated pointing system or similar system.

8 Claims, 5 Drawing Sheets

(56) References Cited

U.S. PATENT DOCUMENTS

| | | | |
|---|---|---|---|
| 5,430,473 A * | 7/1995 | Beecher et al. | 348/14.05 |
| 5,438,357 A * | 8/1995 | McNelley | 348/14.1 |
| 5,457,370 A | 10/1995 | Edwards | |
| 5,463,432 A | 10/1995 | Kahn | |
| 5,491,632 A | 2/1996 | Pawlak et al. | |
| 5,572,317 A | 11/1996 | Parker et al. | |
| 5,640,007 A | 6/1997 | Talbott et al. | |
| 5,668,629 A | 9/1997 | Parker et al. | |
| 5,764,786 A | 6/1998 | Kuwashima et al. | |
| 5,802,412 A | 9/1998 | Kahn | |
| 6,507,366 B1 * | 1/2003 | Lee | 348/352 |
| 6,519,860 B1 | 2/2003 | Bieg et al. | |
| 6,596,976 B2 | 7/2003 | Lin et al. | |
| 6,650,360 B1 | 11/2003 | Osen | |
| 6,690,978 B1 | 2/2004 | Kirsch | |
| 6,744,403 B2 | 6/2004 | Milnes et al. | |
| 6,771,213 B2 | 8/2004 | Durst et al. | |
| 6,867,799 B2 | 3/2005 | Broemmelsiek | |
| 6,952,646 B2 | 10/2005 | Chang | |
| 7,239,975 B2 | 7/2007 | Coleman et al. | |
| 7,245,251 B2 | 7/2007 | Vogel et al. | |
| 7,349,008 B2 | 3/2008 | Rui et al. | |
| 7,365,771 B2 | 4/2008 | Kahn et al. | |
| 7,450,835 B2 | 11/2008 | Lackey et al. | |
| 7,557,825 B2 | 7/2009 | Ishii et al. | |
| 7,591,195 B2 | 9/2009 | Puzio | |
| 7,672,781 B2 | 3/2010 | Churchill et al. | |
| 7,855,638 B2 | 12/2010 | Huston | |
| 2002/0005902 A1 | 1/2002 | Yuen | |
| 2002/0057217 A1 | 5/2002 | Milnes et al. | |
| 2002/0149681 A1 | 10/2002 | Kahn et al. | |
| 2003/0025614 A1 | 2/2003 | Kahn | |
| 2003/0214710 A1 | 11/2003 | Takahashi et al. | |
| 2004/0006424 A1 | 1/2004 | Joyce et al. | |
| 2004/0105010 A1 | 6/2004 | Osen | |
| 2004/0119716 A1 | 6/2004 | Park et al. | |
| 2005/0014458 A1 | 1/2005 | Hung | |
| 2005/0083433 A1 | 4/2005 | Wishart et al. | |
| 2005/0134458 A1 | 6/2005 | Leyden et al. | |
| 2005/0174514 A1 | 8/2005 | Nakai et al. | |
| 2006/0045613 A1 | 3/2006 | Leyden et al. | |
| 2006/0077258 A1 | 4/2006 | Allen et al. | |
| 2007/0146484 A1 | 6/2007 | Horton et al. | |
| 2007/0247615 A1 | 10/2007 | Bridges | |
| 2008/0001022 A1 | 1/2008 | Sa et al. | |
| 2008/0002031 A1 * | 1/2008 | Cana et al. | 348/208.14 |
| 2008/0192116 A1 | 8/2008 | Tamir et al. | |
| 2008/0271220 A1 | 11/2008 | Chilton et al. | |
| 2009/0028386 A1 | 1/2009 | Michimoto et al. | |
| 2009/0096871 A1 | 4/2009 | Kuwano et al. | |
| 2009/0145371 A1 | 6/2009 | Kramer | |
| 2009/0167867 A1 | 7/2009 | Lin et al. | |
| 2009/0267895 A1 | 10/2009 | Bunch | |
| 2009/0300122 A1 | 12/2009 | Freer | |
| 2010/0026809 A1 * | 2/2010 | Curry | 348/157 |
| 2010/0118149 A1 | 5/2010 | Levin et al. | |
| 2010/0149399 A1 | 6/2010 | Mukai et al. | |
| 2010/0191651 A1 | 7/2010 | Irmscher et al. | |
| 2011/0050878 A1 | 3/2011 | Wells et al. | |
| 2011/0090341 A1 | 4/2011 | Ikewada et al. | |
| 2011/0109554 A1 * | 5/2011 | Boissier | 345/166 |
| 2011/0163908 A1 | 7/2011 | Andersson et al. | |
| 2011/0187865 A1 | 8/2011 | Felt et al. | |
| 2011/0228098 A1 * | 9/2011 | Lamb et al. | 348/164 |
| 2012/0218415 A1 * | 8/2012 | Chun et al. | 348/152 |
| 2012/0219271 A1 | 8/2012 | Vunic et al. | |
| 2012/0269386 A1 | 10/2012 | Hankins et al. | |
| 2013/0077931 A1 * | 3/2013 | Cornell et al. | 386/224 |

FOREIGN PATENT DOCUMENTS

| | | | |
|---|---|---|---|
| KR | 1019980043069 A | 8/1998 | |
| WO | 9501768 A1 | 6/1995 | |

OTHER PUBLICATIONS

Gibbings et al., Assessing the Accuracy and Integrity of RTK GPS Beneath High Voltage Power Lines, 2001—A Spatial Odyssey: 42nd Australian Surveyors Congress, date of publication unknown, available at URL eprints.usq.edu.au/2606/1/gibbings.pdf.

Oncore, Chapter 2 GPS Principles, date of publication unknown, available at URL gpsd.berlios.de/vendor-docs/motorola/ch2.pdf.

Dana M. Sommer, Principles of GPS, Presentation Slides, date of publication unknown, available at URL des.memphis.edu/esra/.../Principles%20of%20GPS%204-13-04.pdf.

Kaplan et al., Understanding GPS Principles and Applications, book, 2006, Artech House, available at URL http://www.bdu.ac.in/ckr/uploads/Earth/GPS%20%FULL%20All%20in%201.pdf.

Clifford et al., Measuring Tilt with Low-g Accelerometers, Freescale Semiconductor Application Note, May 2005, Freescale Semiconductor, available at URL http://classes.cecs.ucf.edu/seecsseniordesign/su2006fa2006/g09/files/patrick/measuring%20tilt%20with%20low-g%20accelerometers.pdf.

Kimberly Tuck, Tilt Sensing Using Linear Accelerometers, Freescale Semiconductor Application Note, Jun. 2007, Freescale Semiconductor, available at URL http://www.mh-hannover.de/fileadmin/zentrale_einrichtungen/zentrale_forschungswerkst/downloads/AN3461.pdf.

Barwani et al., Vehicle Dynamics Lab GPS Tracking Camera Turret, web site, 2009, available at URL http://www.me.berkeley.edu/ME102B/Past_Proj/f09/17%20GPS%20Camera%20Turret%20Website/Home.html.

* cited by examiner

FEEDBACK AND MANUAL REMOTE CONTROL SYSTEM AND METHOD FOR AUTOMATIC VIDEO RECORDING

CROSS-REFERENCE TO RELATED APPLICATIONS

This application claims the benefit of U.S. Provisional Application No. 61/580,080, filed Dec. 23, 2011; U.S. Provisional Application No. 61/580,084, filed Dec. 23, 2011; U.S. Provisional Application No. 61/580,093, filed Dec. 23, 2011; U.S. Provisional Application No. 61/580,101, filed Dec. 23, 2011; U.S. Provisional Application No. 61/580,112, filed Dec. 23, 2011; U.S. Provisional Application No. 61/580,115, filed Dec. 23, 2011 and U.S. Provisional Application No. 61/745,346, filed Dec. 21, 2012, the contents all of which are incorporated herein by this reference and are not admitted to be prior art with respect to the present invention by the mention in this cross-reference section.

BACKGROUND

Recording a person participating in an activity is an important task. A surfer may wish to capture his surfing experience for later enjoyment or to improve his or her surfing technique. A father may wish to record his son's winning touchdown in a football game. A mother may wish to capture her daughter's record-breaking gymnastics performance. In each of these examples, the camera is far away from the participant. To record the participant, a second person is needed to control and position the camera. Because humans are imperfect, the quality of the recorded video may not be ideal. For example, the camera operator or cameraman may have an unsteady hand making the recorded video too shaky and unbearable to watch. Additionally, the cameraman may become tired and may not keep the participant in the view field of the camera. In this situation, the cameraman may fail to capture an exciting or interesting moment. Further, some participant may not have a second person lined up to help filming. In this case, the individual loses the chance to record him or herself.

SUMMARY OF THE INVENTION

In accordance with a preferred embodiment hereof, this invention provides a system for automatic video recording of a freely moving subject by a camera, the system comprising a positioner that is capable of turning the camera, a base unit, and a remote unit; wherein the remote unit is collocated with the subject and the base unit communicates with the remote unit and provides commands to the positioner to turn the camera in the direction of the remote unit; wherein the system further comprises a feedback device that provides information to the subject about the status of the system.

In accordance with another preferred embodiment hereof, this invention provides a system for providing remote manual control to a subject recorded by an automatic recording system, the system comprising a camera; a positioner that orients the camera at the subject; a base unit; and a remote unit; wherein the remote unit is substantially collocated with the subject during use and wherein the remote unit is equipped with at least one manual control that, when engaged, causes the remote unit to send at least one signal to the base unit that overrides the automatic operation of the automatic recording system.

In accordance with another preferred embodiment hereof, this invention provides a method of manual control by a freely moving subject being recorded by an automatically positioned camera, said method comprising the steps of initializing the automatic camera positioning system; recording the subject; sending a feedback signal to the subject about the recording status, wherein the recording status comprises camera settings and orientation; sending a signal from the subject to the automatic camera positioning system; and overriding the automatic camera positioning process by the signal from the subject.

This invention also provides each and every novel feature, element, combination, step, and/or method disclosed or suggested herein.

DETAILED DESCRIPTION OF THE PREFERRED EMBODIMENTS

The invention disclosed herein is a system and method for providing feedback and remote control capabilities for a user of an automated video recording system designed to record the activities of a freely moving subject. Applicant has invented systems and methods that automatically point a camera, video recorder, and the like, at a freely moving subject during an activity such as, for example, surfing. That invention is described and claimed in co-pending U.S. patent application Ser. No. 13/726,203, filed Dec. 23, 2012, the content of which is incorporated herein by this reference. Applicant's system is advantageous in that it permits recording of an activity without a cameraman. To make best use of the system described in the aforementioned '203 patent application, the user should be able to receive feedback regarding the status of the system (whether or not the system is working as intended). Additionally, the invention hereof relates to systems and methods that allow a user to correct a condition if he or she is alerted to a condition via a feedback alert. Thus, one component of the invention disclosed herein relates to controlling an automated camera system from a remote unit that is with the target of the automated recording.

The inventive systems and methods hereof relate to an automatic video recording system which records video during an activity such as, for example, surfing. It is noted that the systems and method hereof may be used with any number of activities such as soccer, hang gliding, skiing, wake boarding, football, tennis, and countless others. The automatic video recording system automatically tracks the person engaged in the activity so that the person remains substantially within the view field of the recording camera and without the need for engaging the services of a second person to operate the camera.

It is noted that the words "recording", "video recording", "videotaping", "filming", and the like all refer to generating a single image, such as a photograph, or a recorded image series that may be played back and viewed. The recorded image series appears either as a continuous motion picture or as a series of photographs taken with brief pauses without regard to the actual recording device, its type of memory, recording medium, or means of recording. The word "recording" as used herein includes also generating a video stream, irrespective of whether the video is saved or not.

Automatic recording of a person or persons engaged in an activity, or more generally, of an object moving around without a predetermined path, is a complex task. In a preferred embodiment hereof, a system is configured to orient a camera to automatically follow or track the movements of the person (i.e., the subject) engaged in the activity. The system of the present invention relates to a device, or a plurality of devices, that orients or points a camera, or a plurality of cameras, so as to track and film a subject or multiple subjects. More specifically, one component of the system of the present invention provides a feedback device for the subject so that the subject can gather information about the pointing and recording of the camera. Further, the subject may manually override the automatic pointing and or recording system when feedback is received, or, more generally, whenever the subject decides to do so for whatever reason. The inventors have observed that it would be beneficial for automatic video recording systems to have feedback and override means and methods that (1) allow the subject to be made aware of whether the automated pointing and or recording is proceeding acceptably and (2) if the subject becomes aware of a problem with automated pointing and or recording, the subject should be provided with means and methods to assess and potentially rectify the situation. To determine whether automated pointing and recording is proceeding acceptably, the following items of information are important to determine: (a) is the camera generally pointing in the correct or desired direction and (b) is the camera recording acceptably. Thus, the feedback device communicates information from an automated camera pointing system to a remotely located subject. This information may include the video footage. The remote control aspect hereof is directed toward communicating commands from the remotely located subject to the automated camera pointing system, which may include communicating commands to control the camera.

The present invention provides a system and method to send feedback to the subject while the subject is being filmed by the automated camera pointing system. The steps that accomplish sending feedback include generating information about the direction in which the camera is pointing and about the status of the recording and of the system and delivering this information to the subject.

One component of the automated camera pointing system is a remote unit that is collocated with the subject. The remote unit is preferably equipped with manual controls, such as buttons and switches (and in one preferred embodiment, a touch screen), and with a communication device that sends signals to and receives signals from a base station of the automatic camera pointing system. The base station of the automatic recording device generates commands for the positioner; these commands cause the camera to remain generally or substantially pointed at the subject. The base station is equipped with a central processing unit (CPU) that can receive and interpret information including commands such as commands from the subject (via the remote unit) that may override its automatic pointing and/or recording process. The CPU can send commands to the recording camera, provided that the camera has computer control capability.

The feedback device concerning the orientation of the camera is preferably a light source or a combination of multiple light sources; the light is visible to the subject who can interpret the visual information. Alternatively, or in addition to light, feedback may be sent by electronic signals. The remote unit collocated with the subject may be capable of receiving information such as, for example, a live or delayed video feed or still images. In addition, the subject may wish to receive information about his or her absolute location, information about his or her location relative to the camera, his or her near real time velocity, his or her recent maximum velocity, his or her altitude, or his or her altitude change, etc., all depending on the particular activity being filmed.

Figure 1:
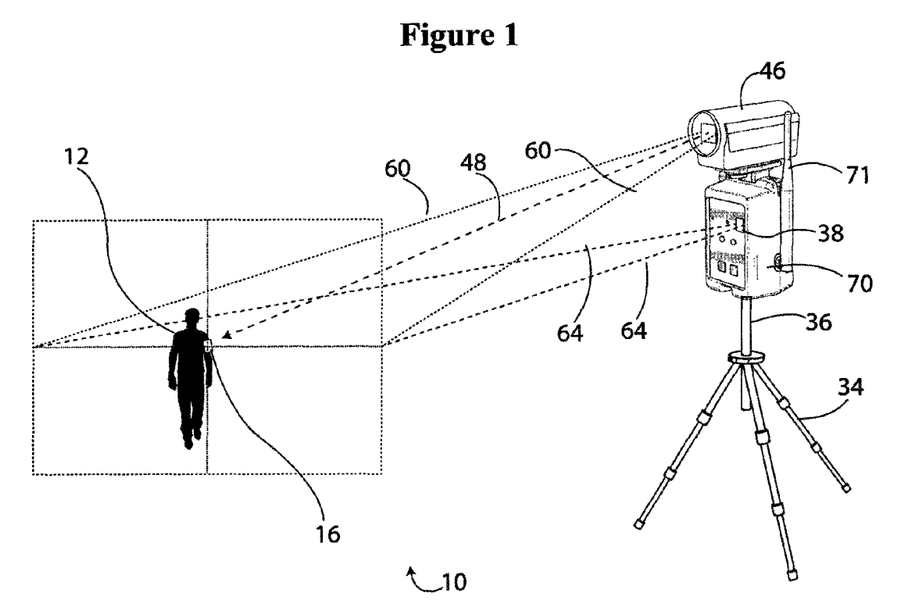
FIG. 1 shows a general overview of an automated camera pointing system and recording camera including the inventive feedback system according to a preferred embodiment of the present invention.

FIG. 1 shows a general overview of an automated camera pointing system and recording camera including the inventive feedback system according to a preferred embodiment of the present invention. One preferred embodiment of an automated camera pointing system is automatic recording system 10 shown in FIG. 1. Automatic recording system 10 is configured to detect the location of and track subject 12. Subject 12 is freely moving. Subject 12 may be a person participating in an activity, an animal, or any freely moving object. In the embodiment illustrated in FIG. 1, automatic recording system 10 comprises remote unit 16 and an orientation controller 70. Orientation controller 70 is a unit that encloses base unit 18 (which may also be referred to herein as base station 18) and a positioner (refer to FIG. 2 of the '203 patent incorporated by reference above). Remote unit 16 is collocated with subject 12, as shown. Camera 46 is mounted on orientation controller 70; orientation controller 70 automatically orients camera 46 such that it tracks subject 12 as subject 12 moves. When tracking or following subject 12, camera 46 points along the relative position pointing vector 48 at or in the general direction of remote unit 16, as shown. The zoom level of camera 46 is preferably set such that subject 12 is entirely within field of view 60 of the camera 46.

In a preferred embodiment of the present invention orientation controller 70 is equipped with a feedback device in the form of a light source 38, as shown. According to a preferred embodiment, the light source 38 is at least one light emitting diode (LED). In this embodiment, light source 38 emits a substantially collimated light beam 64 in the same direction 48 in which the camera 46 is pointing. In an alternative embodiment of the present invention, light source 38 may be integrated with camera 46. As noted, light source 38 is included to provide feedback to subject 12.

In those embodiments which comprise a collimated light beam, the collimated light beam may be fixed or zoom dependent. In one preferred embodiment the collimation is fixed for a typical zoom camera angle (such as, for example, about 5 degrees±about 2 degrees for an application where subject 12 is a surfer and a shot that captures the wave action surrounding the surfer is desired). The collimation angle may be conveniently adjusted by moving the LED closer or farther from a collimating slit or opening on a front panel of its housing.

In a preferred embodiment the collimation is in one dimension only. The one dimension collimation is used, for example, where the direction of the collimation corresponds to a panning camera movement. In other embodiments the slit may be replaced by a circular opening or other opening that restricts the light beam in two dimensions.

During filming, when subject 12 sees the light from the light source 38, the subject knows that the camera continues to generally or substantially point at the subject.

In the embodiment shown in FIG. 1, the camera 46 is firmly attached to the orientation controller 70. Orientation controller 70 preferably comprises a pan drive to pan the attached camera left and right. The camera 46 is preferably attached to the orientation controller 70 with a fastener such as a threaded fastener.

Figure 2:
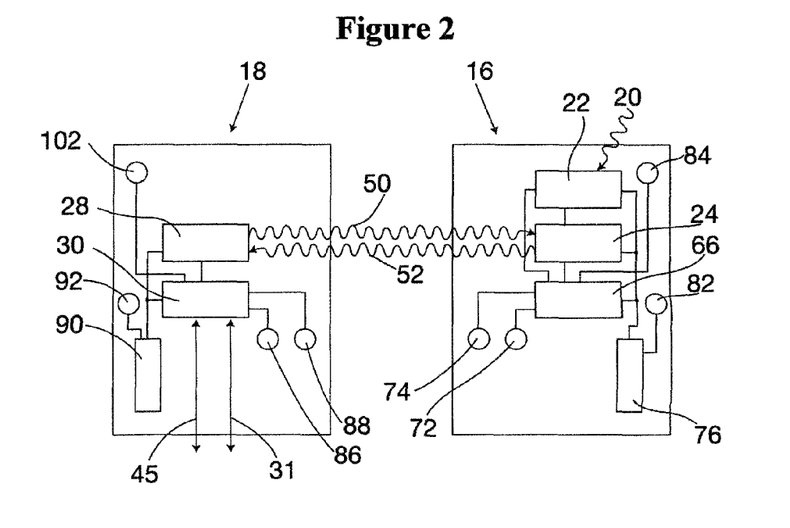
FIG. 2 shows a schematic block diagram of the electronic components of base station and of the remote unit according to the inventive system.

FIG. 2 shows a schematic block diagram of the electronic components of base station and of the remote unit according to the inventive system. More particularly, FIG. 2 shows the structure and organization of base station 18 and of remote unit 16, and the communication between them. In the embodiment shown, remote unit 16 comprises a receiver 22 of signals 20 of Global Positioning satellites or other satellite-based or terrestrial-based positioning system. Both units comprise two-way radio communication devices, also called transceivers, (24 and 28) that are capable of sending signals to each other (50 and 52). These signals include identifiers that are used to establish unique communication in order to exclude errors related to receiving signals from other similar systems that operate in the vicinity where system 10 is used. Furthermore, signals may contain information received or parsed by the receiver 22, commands, status confirmation, and the like. Base station 18 further comprises battery 90 that powers its components, a charge indicator 92, a Central Processing Unit (CPU) 30, a status indicator LED 102, and manual controls 86. Remote unit 16 comprises battery 76 that provides power to its components, charge indicator 82, microcontroller 66, status indicator 84, and manual controls 72 and 74. The CPU gives instructions to and receives status feedback (31 and 45) from the positioner 32 (not shown), and from the camera 46 (not shown), respectively.

Base unit 18 comprises a central processing unit (CPU) and communication devices that enable communication of electronic signals with remote unit 16 and with positioner 32. In some embodiments, base unit 18 may also communicate with camera 46. To perform subject tracking, the CPU executes a process that determines and saves an initial pointing angle or pointing vector of camera 46 when the automatic recording system 10 is set up and initialized at the venue of recording. Subsequently, as the location of remote unit 16 (and of the subject 12) changes, the base unit 18 updates the pointing angle or pointing vector required for camera 46 to point at subject 12 and sends a signal, or multiple signals, to positioner 32 of orientation controller 70 that causes positioner 32 to orient the camera to the new angle. As previously noted, the positioner 32 orients the camera 46 to keep the field of view 60 of the camera on the subject 12 when collocated with the remote unit 16.

In one preferred embodiment, base station 18 is integrated with positioner 32 to form a unitary orientation controller as shown in the embodiment of FIG. 1. In another preferred embodiment, base station 18 may be separate from positioner 32 and may be located elsewhere. In such embodiment, appropriate devices are provided for communication between these units.

In the preferred embodiment shown in FIG. 1, orientation controller 70 houses light source 38, preferably a feedback LED that shines a collimated light beam along the camera pointing vector 48. The feedback LED is powered by a battery or other appropriate power source. Subject 12 only sees the light when subject 12 is in the field of view of camera 46. In other embodiments, feedback light 38 may be mounted on camera 46, for example. The feedback LED is preferably recessed so that an opening on the front of the housing may serve as a collimator. It should be noted that a laser light source may also be used as a light source. Light source 38 provides visual confirmation to subject 12 that positioner 32 is pointing camera 46 in the direction of subject 12. This is highly advantageous as it provides feedback to the subject of the recording about the status of the recording.

It should be noted that the systems disclosed herein may also communicate the status of the recording to the subject by communicating pictures or footage recorded by the camera. This provides additional information about the quality of the recording, including whether the camera is on or off, the condition of the focus and zoom settings (and whether these settings are correct), and whether the lighting is appropriate, etc. The feedback devices of the present invention are highly useful to communicate proper recording status of the automatic recording system 10. If or when the subject determines that the recording status is incorrect, then the subject is provided with a way to rectify the problem so that proper recording may proceed as discussed further herein. In a preferred embodiment of the present invention, remote unit 16 preferably comprises a manual control. When the manual control on remote unit 16 is engaged, remote unit 16 transmits a signal to base unit 18 that overrides the commands of base unit 18 and causes the camera 46 to change orientation. Next, the subject determines if camera 46 is pointed sufficiently at subject 12 using the feedback devices described and claimed herein. Subject 12 may then, using a manual control on the remote unit 16, reset or otherwise override the initial pointing angle or pointing vector of camera 46 to the current pointing angle or current pointing vector of camera 46. The normal operation of the base unit 18 and the automatic recording system 10 can then resume. According to a preferred embodiment of the present invention, camera 46 may receive and implement commands from the base unit 18 that adjust its functions, such as the zoom function, the recording start function, and the stop recording function.

Figure 3:
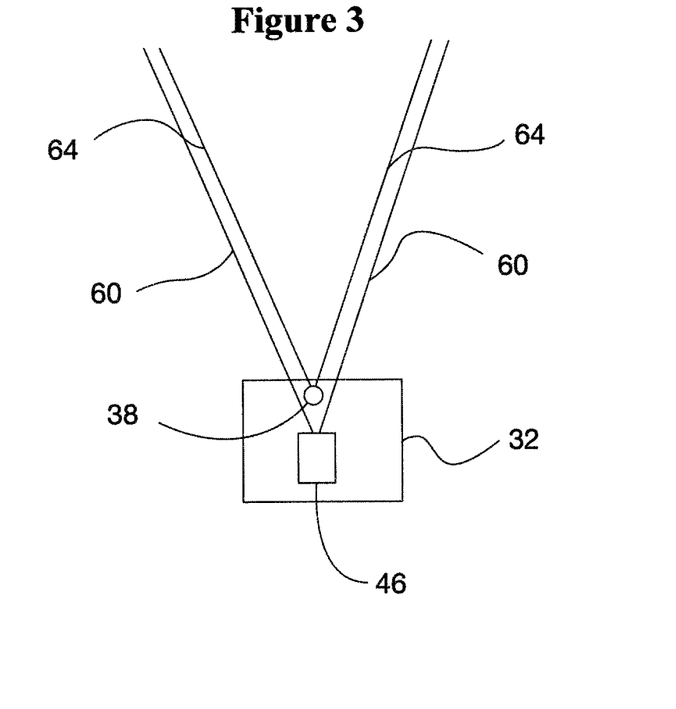
FIG. 3 shows a schematic view of a preferred embodiment of the inventive system wherein the feedback system contains a light emitting diode.

FIGS. 3, 4, 5 and 6 show three different embodiments of light source 38 used during filming to inform the subject 12 that the camera 46 continues to point sufficiently at the subject 12. All three figures show a schematic overhead view of positioner 32 that holds the feedback light sources and camera 46 with the zoom angle directions shown as lines 60. In all three embodiments the light sources and the camera lens are in different horizontal plains, therefore there is no obstruction in front of the lens of camera 46. In the embodiment shown in FIG. 3, the feedback is accomplished via the collimated light beam 64, emitted by a light source 38. A collimated light beam is a light beam that is delimited by at least one mechanical obstruction, the collimator, such that there is an edge of the light beam. Such edges are illustrated as lines 64 in FIG. 3. On the two sides of an edge there is a discernable difference in light intensity from the light source 38. The light source 38 of FIG. 3 is preferably a light emitting diode. The field of view 60 of camera 46 and light beam 64 are characterized by having substantially the same angle. If the system is equipped with automatic zoom control of camera 46, a corresponding control is preferably provided (not shown) for the collimation of the light emitting diode. This control may be in the form of a motor that moves the LED farther from the collimating slit for the smaller angle associated with a higher zoom or an actuator capable of adjusting the width of the slit to adjust the collimation angle.

Figure 4:
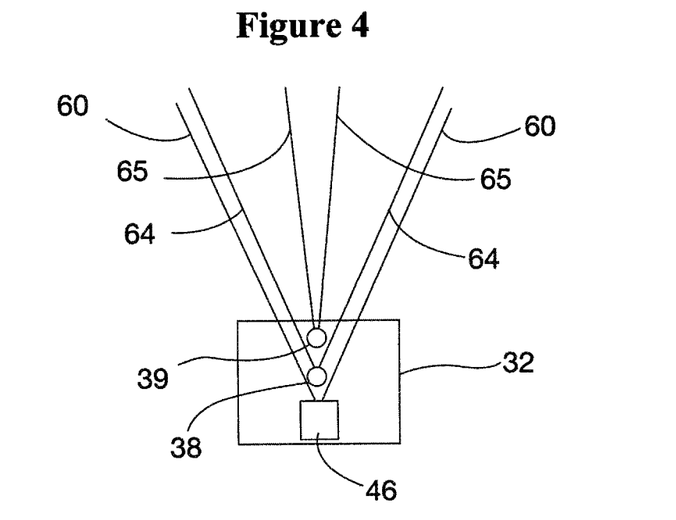
FIG. 4 shows a schematic view of another preferred embodiment of the inventive system wherein the feedback system contains more than one light emitting diode.

In the embodiment shown FIG. 4, the positioner 32 is preferably equipped with two light sources—light source 38 and light source 39—each light source emitting a different color of light. In one preferred embodiment, the light sources are light emitting diodes. In this embodiment beam 64 is wider and beam 65 is narrower, both pointing along the camera pointing vector. In this embodiment, the subject 12 is able to see if he is generally in the view of the camera and that he is close to the middle of the frame.

Figure 5:
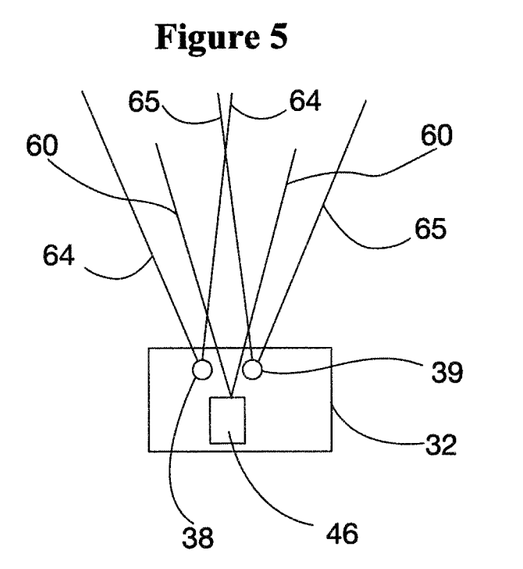
FIG. 5 shows a schematic view of yet another preferred embodiment of the inventive system wherein the feedback system contains more than one light emitting diode.

FIG. 5 shows yet another embodiment wherein the light beam directions are off center. Beam 64 points somewhat to the left and beam 65 points somewhat to the right. Each light source preferably emits a different color. In a narrow area along the camera axis direction, both light beams are visible and appear as a mixed color. When the subject 12 is off center, the color indicates which side of the pointing direction of the camera the user is located.

Figure 6:
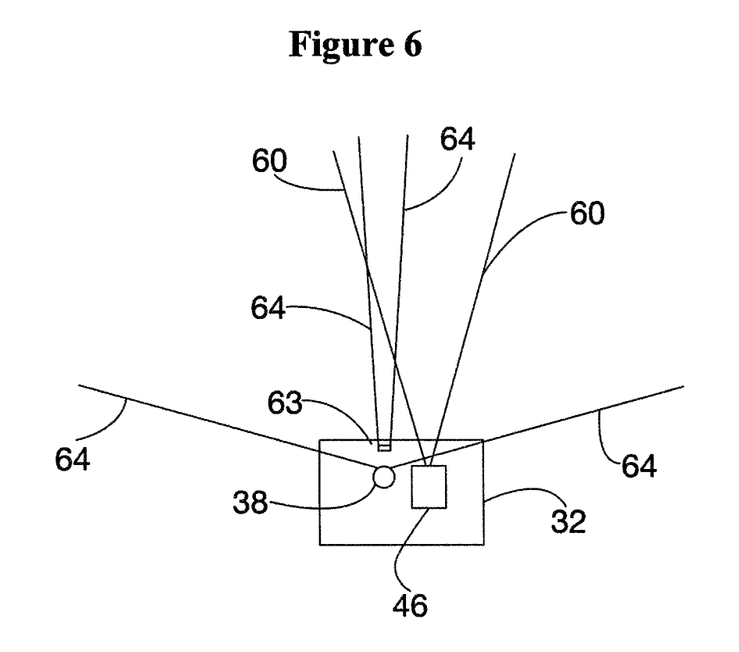
FIG. 6 shoes a schematic view of a preferred embodiment of the inventive system wherein the feedback system contains at least one light emitting diode and a light block.

FIG. 6 shows an embodiment where the feedback light source 38 (preferably an LED) provides a wide angle beam the edges of which are marked 64. A central portion of the beam is blocked by a post or similar implement 63. The effect of this blocking is that the light is not visible or significantly dimmed within the view angle (field of view 60) of the camera 46. When the subject 12 sees full light intensity from the LED, he is alerted that the camera is not pointing at him or her.

Figure 7:
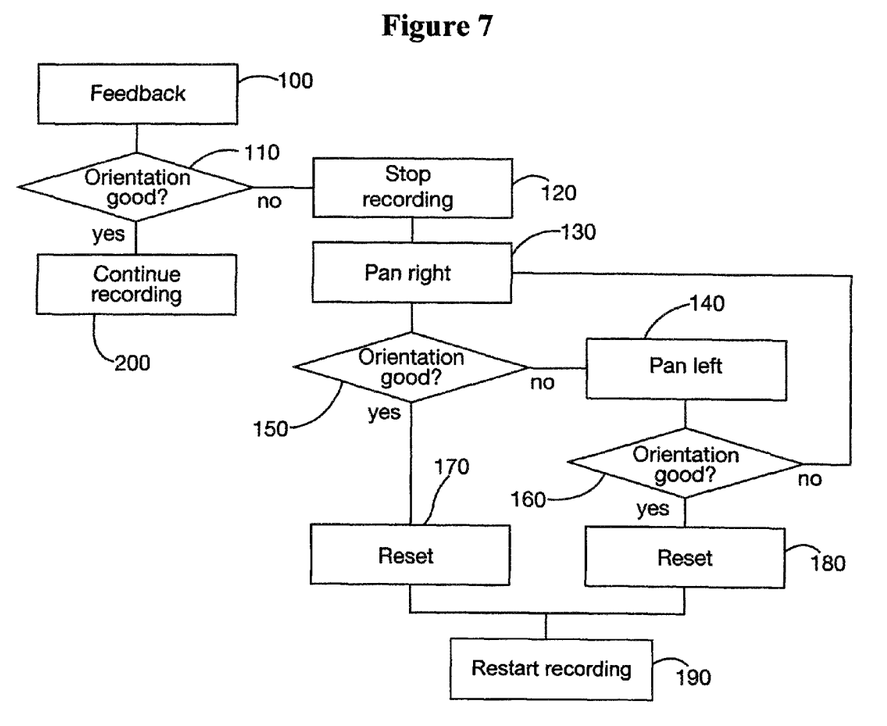
FIG. 7 shows a flow diagram illustrating an embodiment of the manual remote control method.

Based on the feedback provided, the subject 12 may elect to reset the positioner. With reference to FIG. 7, remote device 16 is preferably equipped with an input interface such that subject 12 may use remote unit 16 to communicate with and give commands to the base unit 18. These commands are essentially manual overrides and may include, for example, stop recording, begin recording, pan to right, pan to left, and reset. One reason for initiating such commands is that the subject 12 receives feedback from the base unit that alerts him or her to problems in the recording.

If the feedback 100 indicates that the orientation is good (step 110), there is no need for action and recording continues in step 200. If the orientation is not good, the subject can stop the recording at step 120 and pan the camera, for example, to the right at step 130. If at some point he finds that the orientation is good (step 150), the user resets the system in step 170. Subsequently, the subject restarts recording in step 190 and the subsequent orientation of the camera will be based on the finding that the orientation was correct at the time of the reset. If panning to the right in step 130 does not result in good orientation, the user may pan the camera to the left in step 140. It should be noted that the user may begin panning to the left immediately if he or she suspects that the camera is off in that orientation. If good orientation is found (step 160), then the user resets system in step 180 and restarts recording in step 190. In the event that good orientation is not found by panning left in step 160, the user turns to panning right in step 130.

Figure 8:
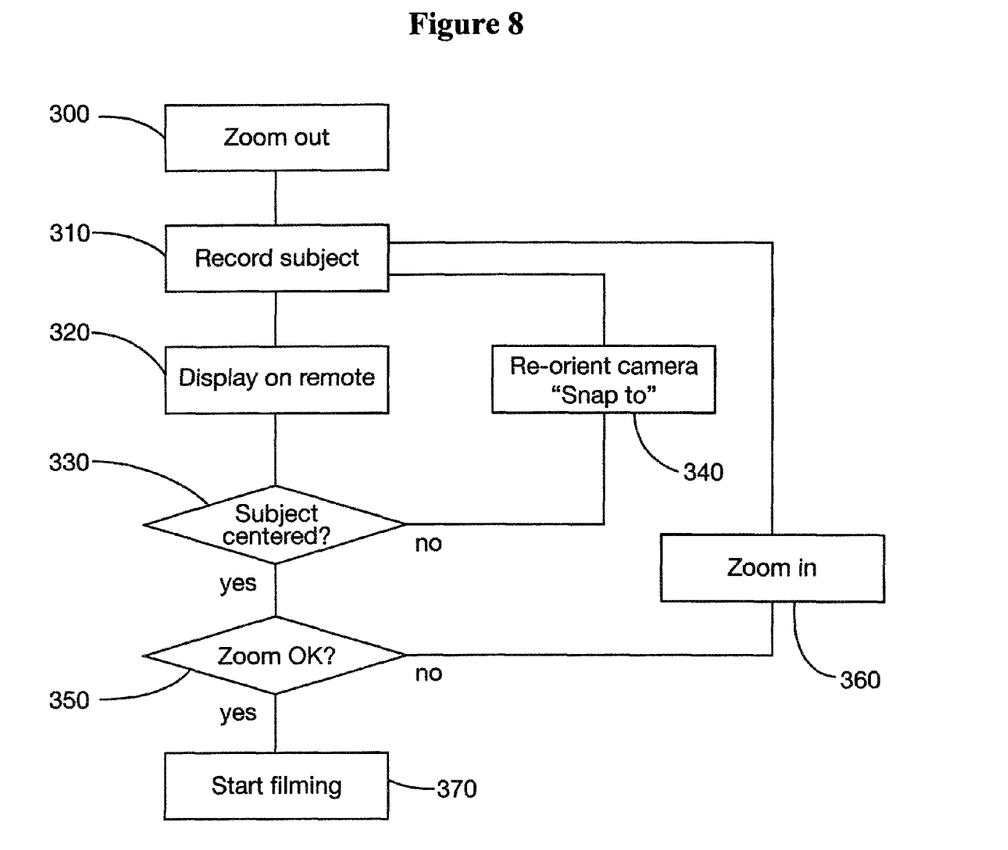
FIG. 8 shows a flow diagram illustrating a method of using feedback and manual control for initializing camera orientation.

FIG. 8 shows a flow diagram illustrating a method of using feedback and manual control for initializing camera orientation. In this embodiment recorded and/or real time images are displayed on a screen of the remote unit 16. The process depicted in FIG. 8 begins with zooming out step 300. This ensures that the subject will be part of the image recorded with the camera as long as the orientation is not entirely off. When an image is recorded in step 310, the subject looks at the image as it is displayed on the remote unit in step 320 and determines whether he or she finds his or her image centered in the frame in step 330. If the subject is not centered in the frame, the camera orientation is changed accordingly in step 340 and a new image is recorded in step 310. The command to the system that instructs the camera to point at an area tapped, or otherwise identified, on the feedback display is referred to as a "snap to" command. When the subject finds himself sufficiently centered (i.e., he or she answers "yes" to step 330), the subject checks whether the zoom of the camera is adequate in step 350. If not, a command which instructs the camera to zoom in is given in step 360, and the process repeats from step 310. The automatic filming starts in step 370 when the answer to the question about the zoom level in step 350 is "yes". It may take multiple zooming steps to zoom in as desired. In the event that a user zooms in too much, step 360 is replaced by a zoom out command.

The "snap to" command 340 may be initiated by a tap on a touchscreen of the remote unit 16 by the user. The user may double tap the screen to zoom in some pre-determined amount and re-evaluate his position (or the position of the remote unit) relative to the center of the screen. The user may repeat the process until satisfied or until the system has reached the limit of its pointing accuracy. The system may also provide feedback to the subject as to the appropriateness of the zoom level relative to the limits of the system. For example, a red warning light may indicate too much zoom, a green light may indicate an acceptable level of zoom, and a yellow light may indicate a scene that is overly zoomed out. The user may then select a fixed zoom, a fixed zoom relative to the remote unit, a full variable zoom (where the zoom is a function of the distance between remote unit and base unit, velocity of remote unit, altitude of remote unit, quality of connection between the remote unit and base unit, quality of locating data, missing data, etc.) or some other fully automatic zoom determination algorithm.

Other embodiments may further take advantage of the combination of feedback and control. For example, in one preferred embodiment, a user may place a visual tag or marker into a recording for ease of finding a specific video clip. In an embodiment where camera control is not available, the remote unit may be equipped with a MARKER button, or control. The operation of this control sends a signal to base unit 18 that causes the positioner to quickly move the camera away from a first position to a second position and back to its first position. In this embodiment, "away" means that the camera undergoes sufficient movement to have the camera field of view change to an entirely new field of view or undergo rapid motion such as rapid panning motion. This feature is advantageous in that it would permit one to quickly select important video footage from a long video recording session. For example, during a three-hour surfing session, the subject may wish to record the entire session to ensure that all surfing activity has been recorded. To make later video processing easier, the subject presses the MARKER button after catching a wave. Video-editing software will recognize this visual marker and easily segment the large video file into smaller, easier to manage portions. This reduces the effort needed to edit a very long recorded session while ensuring a high likelihood of capturing all the desired and interesting footage. By coupling this feature with the feedback device on the base station, the user is able to send a command and gets visual feedback that the command was received.

In accordance with another preferred embodiment, the manual control may interface with and control the camera. In one preferred embodiment the remote device 16 is equipped with a "record last" button or control. The operation of this control sends a command via the base unit to the camera 46 to store the last pre-determined minutes of footage as a separate file. The number of predetermined minutes may be selected during setup from an array of choices (e.g., 1, 2, 3, 4 minutes) or by inputting a number via a keyboard or other input device. In another preferred embodiment, real time playback ability of the recorded video, or still pictures from the recorded video, is provided as part of the remote device 16 having a screen using video communication technology known to those having skill in the art. In yet another preferred embodiment, voice recognition capability is provided with the remote unit 16. In such an embodiment, the user/subject may give voice commands to the base unit 18 via the remote unit 16. Such a feature is advantageous in that it would give a user the ability to start and stop recording by voice commands. Commands "start recording", "stop recording", and "record the last predetermined minutes" would assist in later viewing and editing.

In another preferred embodiment the automatic video recording system uses a single positioner and single camera to track multiple remote units. For example, at a sporting event, multiple subjects may be within the camera view. A CPU preferably computes an optimal direction for the camera, combined with an appropriate zoom, based on the locations of the multiple remote devices and the location of the camera to ensure that multiple targets appear within the field of view of the camera. Preferably, the positioner moves the camera to capture all of the multiple targets in its field of view, if possible, and select some targets for recording if recording all targets is not possible. The system provides feedback that the subjects can use to know when they are in the field of view of the camera, or when they are being recorded by the camera.

In another preferred embodiment, feedback or information to the user may be provided by sound or by vibration of the remote unit.

In another embodiment of the automatic recording system, multiple cameras may be set up for recording. An appropriately configured base unit serves all positioners and cameras. In such a preferred embodiment, the system provides feedback that the subject or subjects can use to know when they are in the field of view of a camera, or when they are being recorded by a camera. If there is only one user at a time, manual remote control can also be implemented. In the case where multiple users wish to have manual override capabilities, the system may have a hierarchy of users to ensure that users highest in priority are in control of the camera. Alternatively, the system may be capable of sensing when a user is doing the activity meant to be recorded and switch or zoom in on that subject.

In yet another embodiment of the automatic recording system, the system comprises multiple remote devices and multiple positioners and cameras. For example, a series of cameras may be set up along a downhill ski run, a golf course, or similar venue. There are also multiple subjects with remote devices. The base unit sends commands to each positioner and camera to follow and to record targets as they approach a particular camera or will pass near enough a camera for that camera to track that user for a stretch of the ski run maintaining the user within its field of view for that time period. There may be a central processing station that stores files associated with each subject so they may leave the mountain at the end of the day with their footage or with a link to download all their footage from an accessible storage device which may include Internet-accessible hosted storage. The methods described below for the case of a single camera and multiple targets may be applied for target selection for each camera as well as for feedback and remote control availability.

While the examples of embodiments presented here involve radio communication between the remote device and the base unit for the purpose of manual control, other means of communication may be implemented without departure from the inventive system and method.

Applicant has invented and owns many other related inventions as described and claimed in co-pending U.S. patent application Ser. No. 13/726,203, filed Dec. 23, 2012, U.S. patent application Ser. No. 13/726,222, filed Dec. 24, 2012, U.S. patent application Ser. No. 13/726,355, filed Dec. 24, 2012, and U.S. patent application Ser. No. 13/726,380, filed Dec. 24, 2012, the contents all of which are incorporated herein by this reference.

Different preferred embodiments, methods, applications, advantages, and features of this invention have been described above; however, these particular embodiments, methods, applications, advantages, and features should not be construed as being the only ones that constitute the practice of the invention. Indeed, it is understood that the broadest scope of this invention includes modifications. Further, many other applications and advantages of applicant's invention will be apparent to those skilled in the art from the above descriptions and the below claims.

What is claimed is:

1. A system for providing remote manual control to a subject recorded by an automatic recording system, said system comprising: a camera; a positioner that, having been initialized, performs a tracking operation wherein said positioner orients said camera at the subject; a base unit; and a remote unit; wherein said remote unit is substantially collocated with the subject during use and wherein said remote unit is equipped with at least one manual control that, when engaged, causes said remote unit to send a signal to said base unit that results in a new initialization of said positioner wherein the signal sent from said remote unit to said base unit upon engaging said at least one manual control causes said positioner to temporarily stop the tracking operation and to turn said camera in one direction until said at least one manual control is engaged again.

2. The system of claim 1, wherein another signal sent from said remote unit to said base unit upon engaging said at least one manual control causes said positioner to quickly pan said camera away from the subject and immediately pan said camera back to point at the subject.

3. The system of claim 1, wherein another signal sent from said remote unit to said base unit upon engaging said at least one manual control causes said base unit to begin using the current orientation of said camera as a new reference orientation.

4. A method of manual control by a freely moving subject being recorded by an automatically oriented camera of an automatic camera orienting system, said method comprising the steps of:
   a) initializing the automatic camera orienting system;
   b) recording the subject;
   c) sending a feedback signal to the subject about the recording status, wherein the recording status comprises camera settings and orientation;
   d) sending signals from the subject to the automatic camera orienting system; and
   e) altering but continuing the automatic camera orienting process by a signal sent from the subject; and
   f) creating a marker in the footage recorded by the camera of the automatic camera orienting system by sending a signal from the subject that causes the camera to point away from the subject and to immediately return to point at the subject.

5. The method of claim 4 further comprising receiving feedback from the automatic camera orienting system that informs the subject whether the camera is pointing at the subject.

6. The method of claim 4 further comprising sending a first signal from the subject causing the camera to pan right or pan left, and sending a second signal from the subject to initialize the automatic camera orienting system.

7. The method of claim 4 further comprising sending camera control signals from the subject and selected by the subject wherein said camera control signals comprise a camera pan right signal, a camera pan left signal, a camera tilt up signal, a camera tilt down signal, a camera zoom in signal, a camera zoom out signal, a camera stop recording signal, and a camera start recording signal.

8. The method of claim 4 further comprising sending a signal from the subject to initialize the automatic camera orienting system.

\* \* \* \* \*